United States Patent [19]

Rogers

[11] 4,149,334
[45] Apr. 17, 1979

[54] FEATHERED LURE

[76] Inventor: Walter J. Rogers, 2803 Homedale Rd., Klamath Falls, Oreg. 97601

[21] Appl. No.: 882,131

[22] Filed: Feb. 28, 1978

Related U.S. Application Data

[63] Continuation of Ser. No. 671,046, Mar. 29, 1976, abandoned.

[51] Int. Cl.² ............................................. A01K 85/00
[52] U.S. Cl. ................................. 43/42.25; 43/42.37; 43/42.53
[58] Field of Search ................ 43/42.06, 42.08, 42.19, 43/42.24, 42.25, 42.26, 42.27, 42.28, 42.32, 42.35, 42.36, 42.37, 42.45, 42.48, 42.50, 42.51, 42.52, 42.53; D22/28, 29

[56] References Cited

U.S. PATENT DOCUMENTS

| | | | |
|---|---|---|---|
| 2,100,963 | 11/1937 | Keyser | 43/42.52 |
| 2,596,457 | 5/1952 | Wulff | 43/42.27 |
| 2,643,418 | 6/1953 | Auldridge | 43/42.53 X |
| 2,754,612 | 7/1956 | Means | 43/42.32 X |
| 2,873,549 | 2/1959 | Bartlett | 43/42.37 X |

*Primary Examiner*—Nicholas P. Godici
*Assistant Examiner*—Robert P. Olszewski
*Attorney, Agent, or Firm*—Klarquist, Sparkman, et al.

[57] ABSTRACT

Barbules are positioned on a shank of a hook and a channel-like lure body having a rounded tip is molded onto the hook with a central rib embedding the barbules to attach them to the hook in positions extending outwardly and upwardly beyond the edges of the body.

2 Claims, 8 Drawing Figures

U.S. Patent   Apr. 17, 1979   4,149,334
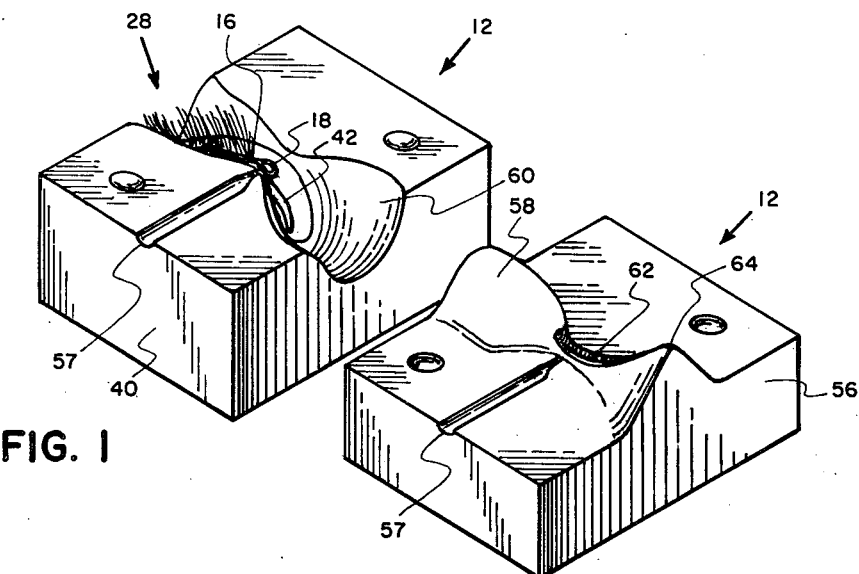
FIG. 1
FIG. 2
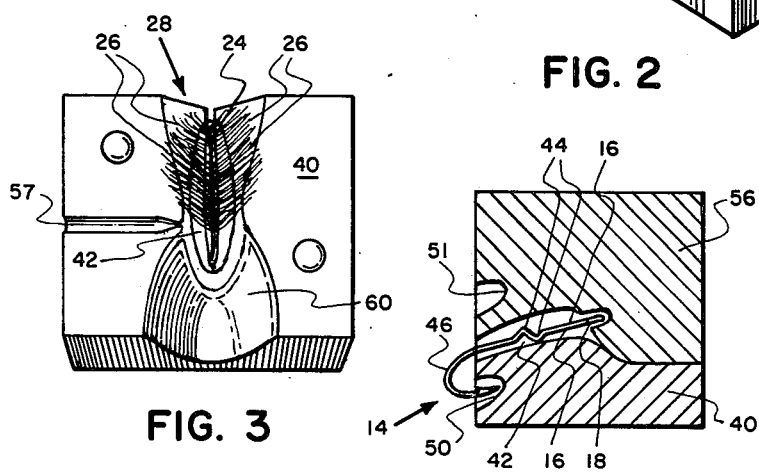
FIG. 3
FIG. 4
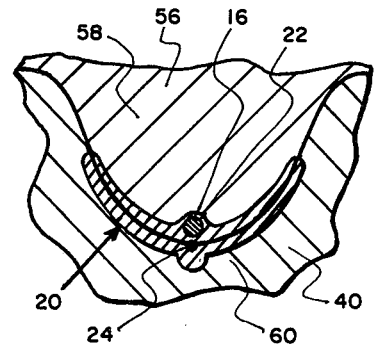
FIG. 5
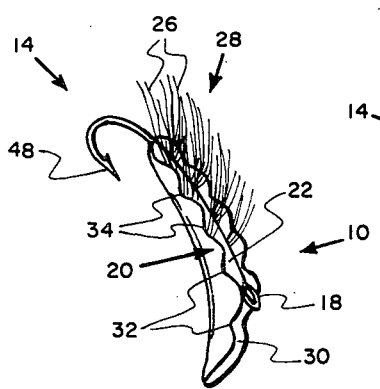
FIG. 6
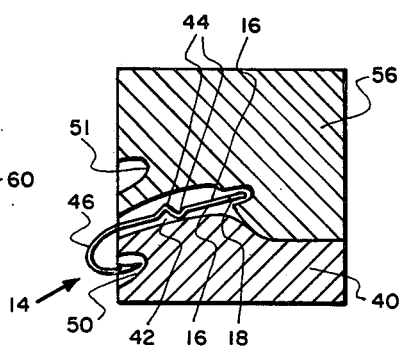
FIG. 8
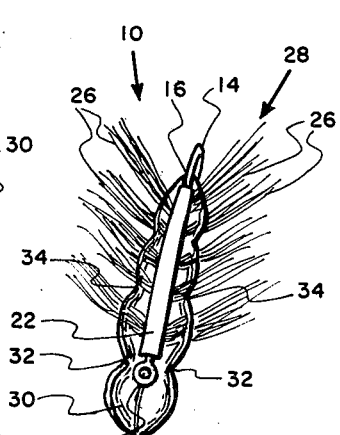
FIG. 7

FEATHERED LURE

DESCRIPTION

This is a continuation of application Ser. No. 671,046, filed Mar. 29, 1976, now abandoned.

This invention relates to feathered lures and a method of and an apparatus for making the same, and has for an object thereof the provision of feathered lures and a method of and an apparatus for making the same.

Another object of the invention is to provide a feathered lure having butt portions of barbules fixed to a body of a lure.

A further object of the invention is to provide a feathered lure having a longitudinally grooved body with barbules extending crosswise of the groove and beyond the side edges of the body.

Another object of the invention is to provide a feathered lure including a feather having its quill portion extending along a shank of a hook and embedded in a body molded onto the shank.

Another object of the invention is to provide a feathered lure including a body having an upwardly facing groove molded on a shank of a hook with barbules extending outwardly and upwardly of the body and with their butt portions embedded in a rib integral with the body.

Another object of the invention is to provide a method and an apparatus for securing barbules to a lure.

Another object of the invention is to provide a method and an apparatus for molding a body on a shank of a hook and embedding butt portions of barbules in the body in positions extending outwardly and upwardly relative to the body.

In the drawings:

FIG. 1 is a perspective view of a lower section of a mold forming one embodiment of the invention with a hook and a feather positioned therein;

FIG. 2 is an inverted, perspective view of an upper section of the mold of FIG. 1;

FIG. 3 is an enlarged, fragmentary, perspective view of the lower section of the mold;

FIG. 4 is a longitudinal sectional view of the mold;

FIG. 5 is an enlarged, transverse sectional view of the mold of FIG. 1 and a feathered lure forming one embodiment of the invention being formed by the mold;

FIG. 6 is a perspective view of a feathered lure forming one embodiment of the invention;

FIG. 7 is an enlarged, transverse sectional view of the feathered lure of FIG. 6; and FIG. 8 is a slightly tilted side elevation view of a feathered lure forming an alternate embodiment of the invention.

Referring now in detail to the drawings, there is shown therein a feathered lure 10 forming one embodiment of the invention and made by a method forming another embodiment of the invention and effected by a mold 12 forming another embodiment of the invention. The lure 10 includes a hook 14 having a shank 16 and an eye 18. An upwardly concave or channel-like body 20 of a flexible, tough, durable, injection molded plastic material is molded onto the shank. The plastic material may be a vinyl, polypropylene, polyethylene or a polyester, for example, molded onto the shank. The body has an upper, central rib 22 embedding a quill 24 and butt portions of barbules 26 of a feather section 28. The feather section may be duck, pheasant, gamecock, neck hackle, or natural or imitation hair, for example. The rib rigidly secures the feather section to the body in positions in which the barbules are flared outwardly and upwardly, the feather section being "stripped" when the body and rib are molded, that is, the barbules are spread out to extend somewhat near right angles to the quill. Preferably, at least half of the length of each barbule is beyond the side edge of the body. The hackles keep the body upright and give it action, and may be of fur or other type of hackle. The body also has, in front of the eye, a downwardly and forwardly extending lip portion 30, provided with notches 32 at its forward lip portion to make it quite rounded. The body also has rounded notches 34 just behind the eye. The body may be designated spoon-like in a broad sense of the term.

To form the feathered lure 10, the hook 14 is placed in a lower female mold section 40 of the mold 12 with the shank 16 lying in a groove 42, undulations 44 substantially centering the shank in the groove. A bend 46 of the hook is positioned beyond the lower mold section and a point 48 of the hook, if downturned, extends into a slot 50 in the lower mold section, or, if upturned, into a slot 51, a narrow portion 52 of the groove fitting closely on the beginning portion of the bend. The feather section 28 then is placed in body cavity 54 of the mold and on top of the shank. An upper, male, mold section 56 then is placed on the lower mold section to cover the cavity 54 and press the outer end portions of the stripped barbules against the lower mold section, the eye of the hook entering a hole in the upper mold section. This clamps the barbules in their upwardly and outwardly flared positions. Then, after clamping the mold sections together, plastic material is injected into the mold cavity through injection passage 57 to fill the mold cavity.

The upper mold section has a rounded protuberance 58 complementary to and fitting into concave portion 60 of the lower mold section. After the plastic material has been injected into and fills the cavity, it cools and hardens, and the mold sections then are separated and the feathered lure is removed from the mold. The upper mold section has a groove 62 which forms the rib 22 and a narrow groove portion 64 fitting closely on the beginning portion of the bend of the hook. The average length of the tip portions of the barbules that extend beyond the side edges of the body is preferably from one-third to two-thirds of the length of the body, and the free portions of the barbules (the portions extending upwardly and outwardly from the rib) preferably are at an angle of at least 45° to the rib. The feathers may, of course, be of any desired color, and the color of the body may be varied as desired and have any desired pattern of contrasting colors. Preferably, the feathers are of the stiff hackle type.

EMBODIMENT OF FIG. 8

A feathered lure forming an alternate embodiment of the invention and shown in FIG. 8 is like that of FIGS. 6 and 7 except that a hook 14 thereof is upturned rather than downturned. The lure of FIG. 8 includes a body 20 having a central rib embedding a feather quill (not shown) like the quill 24. The hook has a shank 16 and an eye 18 and undulations 44. The body is like the body 20 of FIGS. 6 and 7, and has a lip portion 30 with notches 32 to make the lip portion rounded and notches 34.

In explaining in more detail about each of these finished lures, the body is curved and upwardly concave with upwardly and outwardly flared wings of feather, fur or hackle. The curved concave body of the lure when fished or worked through the water, cast or trolled, produces a fast wriggling motion, and the upward and outward flared wing design of the molded feather has a stabilizing effect on the lure, keeping the top side of the lure up at all times while being fished, cast, trolled, fast or slow speed. The lure is durable, possess a unique design that promotes good looks and an unusual fish catching action.

What is claimed is:

1. In a feathered lure, a hook having a shank, a feather having a quill and a plurality of barbules having butt portions secured to the quill and also having outer portions extending from the butt portions, and a downwardly bowed upwardly facing, concave, channel-like body having sheet-like side edge portions, the shank of the hook, the quill and the butt portions being embedded in the central portion of the body and the outer portions of the barbules being flared upwardly and outwardly from the side edges of the body.

2. In a feathered lure, a hook having a shank, a plurality of barbules having butt portions and also having outer portions extending from the butt portions, a downwardly bowed upwardly facing, concave, channel-like body having sheet-like side edge portions, the shank of the hook and the butt portions being embedded in the central portion of the body, the butt portions also being embedded in the body and extending substantially to the side edges of the hook, and the outer portions of the barbules being flared upwardly and outwardly from the side edges of the body, the lengths of the portions of the barbules beyond the side edges of the body being at least as great as the widths of the portions of the body halves from which the barbule portions extend.

* * * * *